G. E. DEAN.
WELDING MACHINE.
APPLICATION FILED JULY 13, 1911.
1,006,537.
Patented Oct. 24, 1911.
2 SHEETS—SHEET 1.
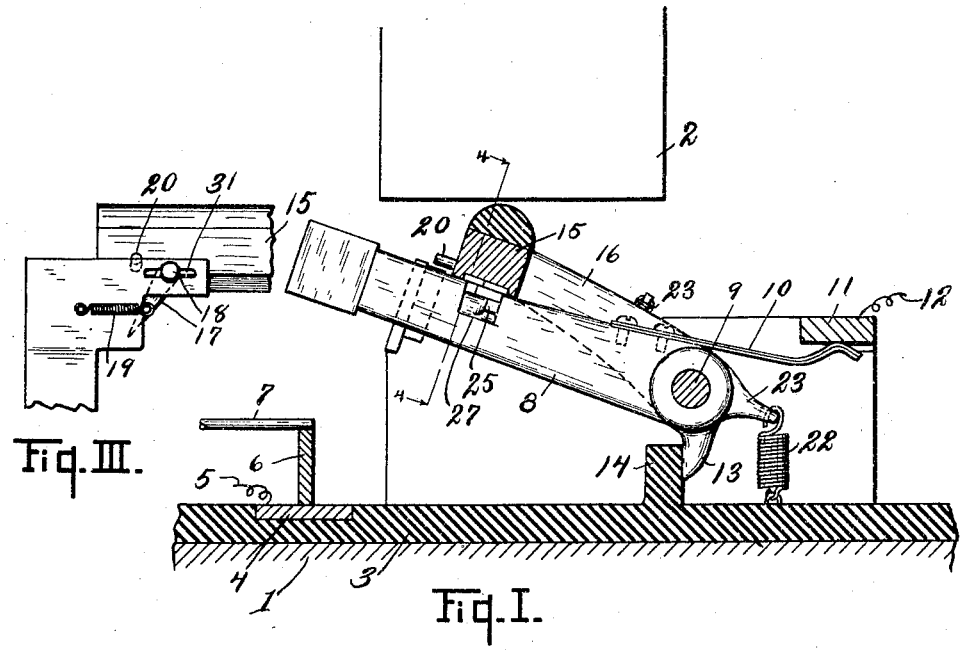
Fig. III.
Fig. I.
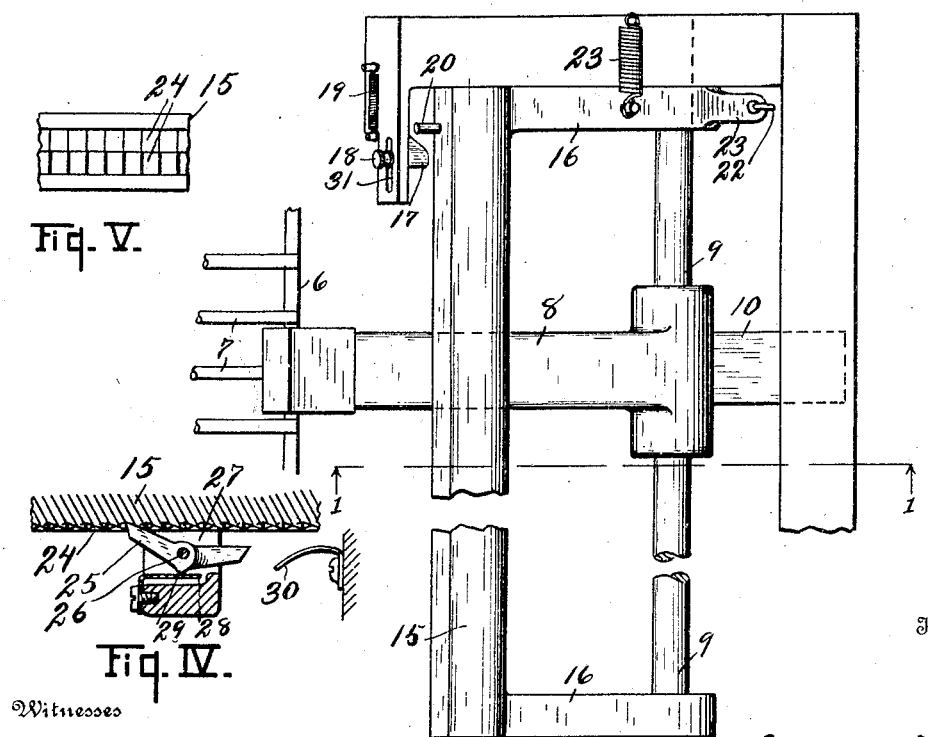
Fig. V.
Fig. IV.
Fig. II.
Witnesses
Phina Woodruff
Luella G. Greenfield
Inventor
George E. Dean
By Chappell Earl Attorneys

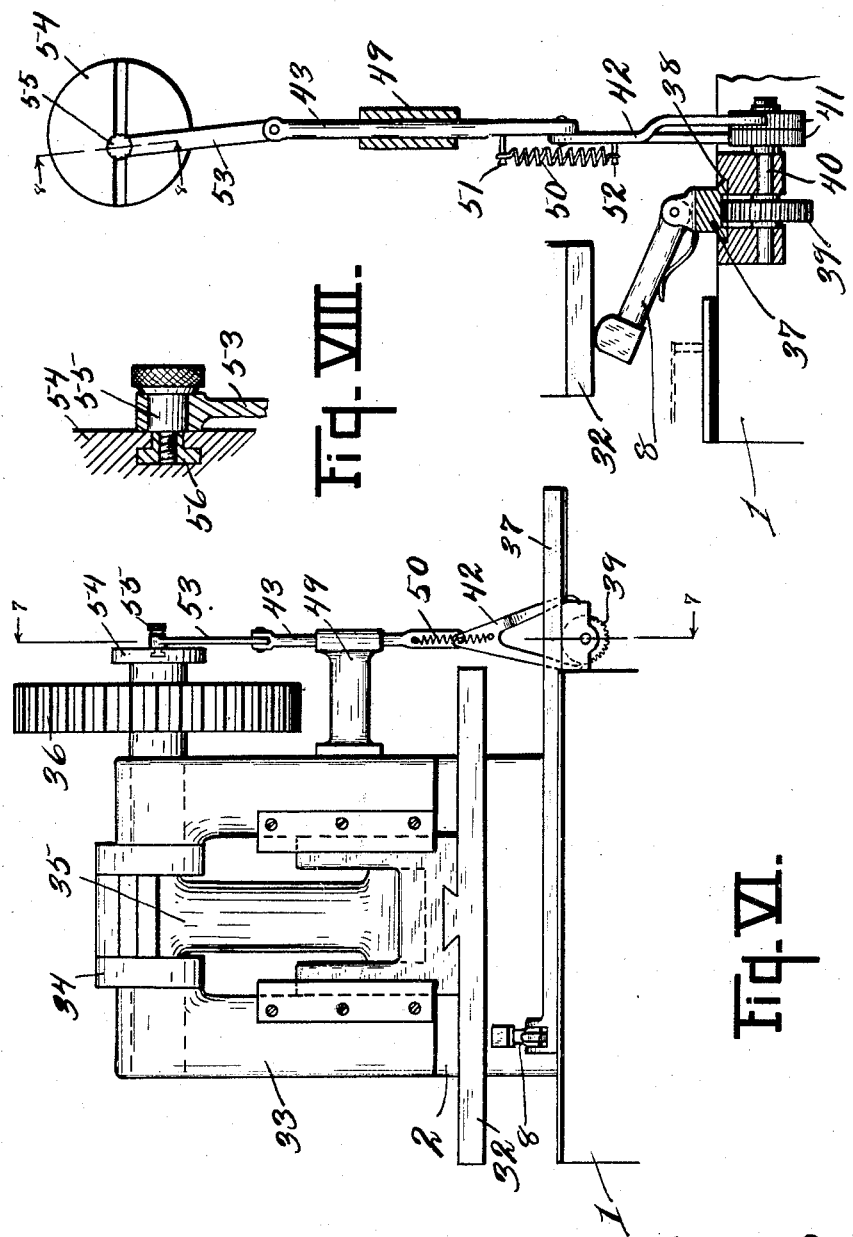

UNITED STATES PATENT OFFICE.

GEORGE E. DEAN, OF ALBION, MICHIGAN.

WELDING-MACHINE.

1,006,537. Specification of Letters Patent. Patented Oct. 24, 1911.

Application filed July 13, 1911. Serial No. 638,317.

*To all whom it may concern:*

Be it known that I, GEORGE E. DEAN, a citizen of the United States, residing at Albion, Michigan, have invented certain new and useful Improvements in Welding-Machines, of which the following is a specification.

This invention relates to improvements in welding machines.

The main objects of this invention are: First; to provide an improved welding machine adapted as an attachment or for embodiment in punch presses of the type in common use. Second; to provide an improved welding machine adapted for use in the manufacture of metal shelves where a series of spaced cross rods are welded to metal frame pieces as shown in the accompanying drawing. Third; to provide an improved welding machine adapted for the class of work stated, which is mainly automatic in its operation. Fourth; to provide an improved welding machine which is economical in structure and at the same time efficient and durable.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a detail vertical section through a structure embodying the features of my invention, taken on a line corresponding to line 1—1 of Fig. II in which my improvements are shown embodied in a machine of the punch press type, the bed, frame and plunger being shown largely in conventional form. Fig. II is a detail plan view of the structure appearing in Fig. I. Fig. III is an enlarged detail front elevation, showing the arrangement of the feed cam. Fig. IV is a detail vertical section taken on a line corresponding to line 4—4 of Fig. I, showing the details of the feed means for the terminal member 8. Fig. V is an inverted view of the plunger bar 15. Fig. VI is a detail front elevation of a modified construction, the modification being in the feeding means for the member 8. Fig. VII is a detail vertical section taken on a line corresponding to line 7—7 of Fig. VI. Fig. VIII is a detail vertical section taken on a line corresponding to line 8—8 of Fig. VII.

Referring to the drawing, 1 represents the bed and 2 the plunger of the machine. On the bed of the machine I arrange a plate 3, which for convenience is shown of insulating material, as the parts carried thereby should be insulated from the bed 1. Seated in this plate 3 is the bed terminal 4. This terminal is connected to a suitable electrical source as by the wire 5. The parts to be joined as the frame piece 6 and the cross rods 7, are arranged on this terminal. The coacting terminal member 8 is actuated by the plunger 2. The terminal 8 is mounted on the rod like way 9 to travel thereon and to permit a pivotal movement. The member 8 is returned in its disengaging or initial position by means of the spring 10, which is secured to the member and arranged with its rear end in sliding engagement with the bar 11. This bar is connected to a suitable electrical source as by means of the wire 12. The upward movement of the member 8 is limited by a stop 13 and the coacting stop bar 14. The member 8 travels under the plunger bar 15, which is actuated by the plunger 2. The arms 16 of the bar 15 are mounted on the way 9 and have a pivotal and longitudinal movement thereon. The longitudinal movement is effected through the feed cam 17, which is mounted on the pivot 18 and provided with the spring 19. On the bar 15 is a pin 20 which coacts with this cam. On the down or work stroke of the plunger bar the pin 20 passes under the cam so that on the return or up stroke of the bar, the bar is carried forward until the pin passes over the upper end of the cam. This return movement of the bar is effected by means of the spring 22 one end of which engages the rearwardly projecting arm 23 on one of the arms 16. When the pin passes from the cam 17 the bar 15 is returned to its initial position by the spring 23.

The bar 15 is provided with a double rack 24. The member 8 is provided with a double reversible pawl 25 coacting with these racks, so that when the bar 15 is moved longitudinally, the member 8 is fed in one direction or the other, according to the engagement of the pawl. The pawl is pivoted at 26 in a slot-like opening provided therefor in the member 8 below the bar 15. A spring 28 engages a projection 29 on the pawl opposite its pivot so that the pawl is yieldingly held with either member in engagement with the rack. To automatically reverse the pawl at the end of the travel of the member 8 I provide trips 30 therefor. By this arrangement of parts on each stroke of the plunger the terminal member 8 is forced down into engagement with the work and on the return of the parts to their initial position the terminal member is automatically fed or advanced with a step-by-step movement. To regulate the length of the feed stroke or step the pivot 18 is arranged in a slot 31. When this pivot is moved to the right the feed strokes are made longer and when it is moved to the left they are made shorter.

In the modification shown in Figs. VI, VII and VIII, the plunger 2 is provided with a cross head 32. The plunger is supported in the frame 33 and connected to the crank 32 by the pitman 35. The crank shaft is driven through suitable gears, only the crank shaft 36 being illustrated. The terminal member 8 in this modified construction is mounted on a rack bar 37 supported in suitable ways 38, driven by the gear 39. On the outer end of the shaft 40 of the gear 39 is a pair of ratchets 41. These ratchets are driven through the double pawl 42 which is pivotally mounted on the plunger rod 43 supported in a suitable bearing on a projecting arm 49 of the frame 33. The pawl is yieldingly held with either of its detents engaged with its coacting ratchet wheel by means of the spring 50, one end of which is secured to the pin 51 on the plunger rod 43, and the other to a pin 52 on the pawl. This spring serves to hold either detent of the pawl in engagement with this ratchet as will be readily understood. The plunger rod 43 is connected by the link 53 to the crank disk 54. The wrist pin 55 is adjustably secured to the disk by grooving the disk and arranging the pin supporting block 56 in the groove. See Figs. VII and VIII. This provides a simple means of adjusting the length of the feed stroke.

The structures illustrated are especially designed for the manufacture of shelves for use in racks such as shown in my application for patent filed April 21, 1911, Serial No. 662,567, in which the shelves are made up of frame bars 6 and cross rods 7 arranged thereon in a spaced relation.

Both forms or embodiments of my invention illustrated, are adaptations of the same to punch presses. The parts of the press are shown mainly in conventional form and merely for the purpose of illustrating my invention.

Other modifications than those shown, will no doubt, suggest themselves to those skilled in the art to which this invention relates.

In the structure shown, Figs. I to V inclusive, the machine is entirely automatic as the terminal member 8 is actuated and suitable pressure applied at each stroke of the plunger and the feed movement is accomplished as described and is automatically reversed in the construction shown in Figs. I to V. In the construction shown in Figs. VI to VIII I do not show means for automatically reversing the feed.

Having thus described my invention, what I claim as new and desire to secure by Letters Patent is:

1. In a structure of the class described, the combination of a terminal member, a rod-like way therefor said member being mounted on said way for longitudinal and pivotal movement thereon, a bar connected to an electrical source arranged at the rear of said way, a spring mounted on said terminal member and having sliding engagement with said bar, whereby said member is electrically connected with said bar and is returned to its initial position; a stop on said terminal member, coacting stop bar arranged parallel with said way, a plunger bar arranged above said terminal member, said bar being mounted on said way for pivotal and longitudinal movement and being provided with a double ratchet, a coacting reversible pawl on said terminal member, reversing trips for said pawl, a pivoted feed cam, said plunger bar being provided with a coacting pin adapted to pass under said cam on the work stroke of said plunger bar, the pivot for said cam being adjustable whereby the feed stroke of the plunger bar may be regulated, and springs for returning said plunger bar to its initial position.

2. In a structure of the class described, the combination of a terminal member, a rod-like way therefor, said member being mounted on said way for longitudinal and pivotal movement thereon, a bar connected to an electrical source arranged at the rear of said way, a spring mounted on said terminal member and having sliding engagement with said bar, whereby said member is electrically connected with said bar and is returned to its initial position; a plunger bar arranged above said terminal member, said bar being mounted on said way for pivotal and longitudinal movement and being provided with a double ratchet, a coacting reversible pawl on said terminal member, reversing trips for said pawl, a pivoted feed cam, said plunger bar being provided with a coacting pin adapted to pass under said cam on the work stroke of said plunger bar, the pivot for said cam being adjustable whereby the feed stroke of the plunger bar may be regulated, and springs for returning said plunger bar to its initial position.

3. In a structure of the class described, the combination of a terminal member, a rod-like way therefor said member being mounted on said way for longitudinal and pivotal movement thereon, a bar connected to an electrical source arranged at the rear of said way, a spring mounted on said terminal member and having sliding engagement with said bar, whereby said member is electrically connected with said bar and is returned to its initial position; a stop on said terminal member, a coacting stop bar arranged parallel with said way, a plunger bar arranged above said terminal member, said bar being mounted on said way for pivotal and longitudinal movement and being provided with a ratchet, a coacting pawl on said terminal member, a pivoted feed cam, said plunger bar being provided with a coacting pin adapted to pass under said cam on the work stroke of said plunger bar, and springs for returning said plunger bar to its initial position.

4. In a structure of the class described, the combination of a terminal member, a rod-like way therefor said member being mounted on said way for longitudinal and pivotal movement thereon, a bar connected to an electrical source arranged at the rear of said way, a spring mounted on said terminal member and having sliding engagement with said bar, whereby said member is electrically connected with said bar and is returned to its initial position; a plunger bar arranged above said terminal member, said bar being mounted on said way for pivotal and longitudinal movement and being provided with a ratchet, a coacting pawl on said terminal member, a pivoted feed cam, said plunger bar being provided with a coacting pin adapted to pass under said cam on the work stroke of said plunger bar, and springs for returning said plunger bar to its initial position.

5. In a structure of the class described, the combination of a terminal member, a rod-like way therefor said member being mounted on said way for longitudinal and pivotal movement thereon, a plunger bar arranged above said terminal member, said bar being mounted on said way for pivotal and longitudinal movement and being provided with a double ratchet, a coacting reversible pawl on said terminal member, reversing trips for said pawl, a pivoted feed cam, said plunger bar being provided with a coacting pin adapted to pass under said cam on the work stroke of said plunger bar, the pivot for said cam being adjustable whereby the feed stroke of the plunger bar may be regulated, and springs for returning said plunger bar to its initial position.

6. In a structure of the class described, the combination of a terminal member, a rod-like way therefor said member being mounted on said way for longitudinal and pivotal movement thereon, a plunger bar arranged above said terminal member, said bar being mounted on said way for pivotal and longitudinal movement and being provided with a ratchet, a coacting pawl on said terminal member, a pivoted feed cam, said plunger bar being provided with a coacting pin adapted to pass under said cam on the work stroke of said plunger bar, and springs for returning said plunger bar to its initial position.

7. In a structure of the class described, the combination of a terminal member, a way therefor, said member being mounted for pivotal movement, a plunger bar arranged above said terminal member, said bar being mounted for pivotal and longitudinal movement and being provided with a double ratchet, a coacting reversible pawl on said terminal member, reversing trips for said pawl, a pivoted feed cam, said plunger bar being provided with a pin coacting with and adapted to pass under said cam on the work stroke of said plunger bar, the pivot for said cam being adjustable whereby the feed stroke of the plunger bar may be regulated, and springs for returning said plunger bar to its initial position.

8. In a structure of the class described, the combination of a terminal member, a way therefor, said member being mounted for pivotal movement, a plunger bar arranged above said terminal member, said bar being mounted for pivotal and longitudinal movement and being provided with a ratchet, a coacting pawl on said terminal member, a pivoted feed cam, said plunger bar being provided with a pin coacting with and adapted to pass under said cam on the work stroke of said plunger bar and springs for returning said plunger bar to its initial position.

9. In a structure of the class described, the combination of a terminal member, a way therefor, said member being mounted for pivotal movement, a plunger bar arranged above said terminal member, said bar being mounted for pivotal and longitudinal movement and being provided with a double rack, a coacting reversible pawl on said terminal member, reversing trips for said pawl and means for actuating said plunger bar longitudinally on each actuation thereof.

10. In a structure of the class described, the combination of a terminal member, a way therefor, said member being mounted for pivotal movement, a plunger bar arranged above said terminal member, said bar being mounted for pivotal and longitudinal movement and being provided with a rack, a coacting pawl on said terminal member and means for actuating said plunger bar longitudinally on each actuation thereof.

11. In a welding machine, the combination of a traveling terminal member, mounted for vertical movement, an actuating bar therefor mounted for vertical and longitudinal movement, said actuating bar being provided with a double rack, a coacting reversible pawl on said terminal member, trips for reversing said pawls at the ends of the travel of said terminal member, means for imparting a reciprocating movement to said actuating bar on each stroke thereof.

12. In a welding machine, the combination of a traveling terminal member, mounted for vertical movement, an actuating bar therefor mounted for vertical and longitudinal movement, said actuating bar being provided with a rack, a coacting pawl on said terminal member, and means for imparting a reciprocating movement to said actuating bar on each stroke thereof.

13. In a welding machine, the combination of a traveling terminal member, actuating means therefor comprising a plunger, and means for automatically feeding said terminal member with a step-by-step movement on each work stroke of the plunger, said means being adjustable for regulating the feed step of said terminal member.

14. In a welding machine, the combination of a traveling terminal member, actuating means therefor comprising a plunger, and means for automatically feeding said terminal member on each work stroke of the plunger.

15. In a welding machine, the combination of the traveling terminal member, a plunger bar for actuating said terminal member, said member being arranged to travel below said bar and means for feeding said terminal member.

16. In a welding machine, the combination of a traveling terminal member, an actuating means therefor, means for feeding said terminal member in both directions and means for automatically reversing the feed at the ends of the travel of said terminal member.

In witness whereof, I have hereunto set my hand and seal in the presence of two witnesses.

GEORGE E. DEAN. [L. S.]

Witnesses:
MABEL GRAVES,
NINA CUATT.

---

Copies of this patent may be obtained for five cents each, by addressing the "Commissioner of Patents, Washington, D. C."